UNITED STATES PATENT OFFICE.

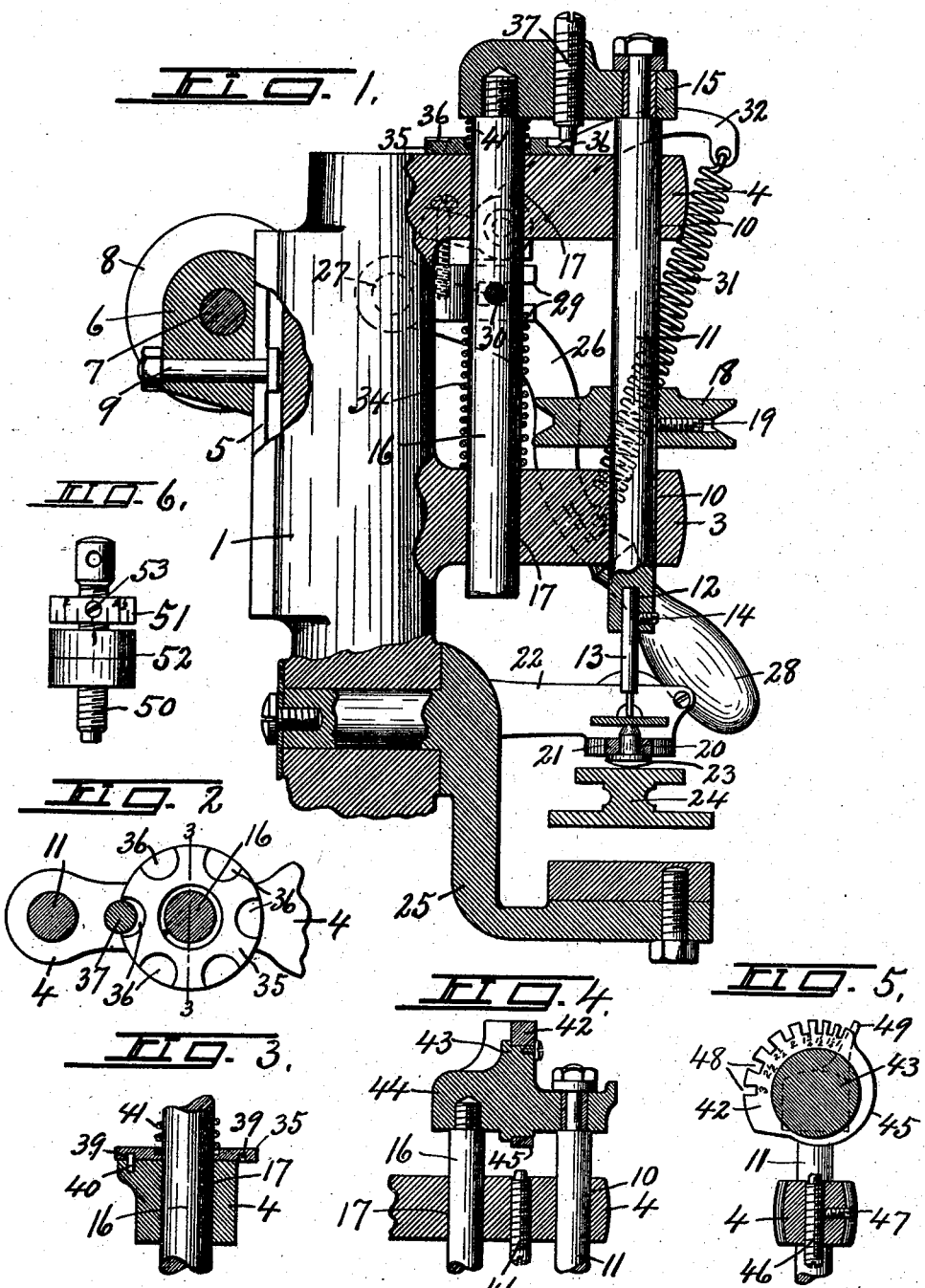

GUSTAV A. BADER, OF ROCHESTER, AND CHAUNCEY W. HOWLAND, OF GENEVA, NEW YORK, ASSIGNORS TO THE STANDARD OPTICAL COMPANY, OF GENEVA, NEW YORK, A CORPORATION OF NEW YORK.

LENS-DRILLING MACHINE.

1,218,041.        Specification of Letters Patent.        Patented Mar. 6, 1917.

Original application filed September 12, 1912, Serial No. 719,950. Divided and this application filed February 24, 1913. Serial No. 750,428.

*To all whom it may concern:*

Be it known that we, GUSTAV A. BADER and CHAUNCEY W. HOWLAND, respectively of Rochester, in the county of Monroe and State of New York, and Geneva, in the county of Ontario, in the State of New York, have invented new and useful Improvements in Lens-Drilling Machines, of which the following, taken in connection with the accompanying drawings, is a full, clear, and exact description.

This invention relates to certain improvements in lens drilling machines and refers more particularly to the stop-gage or drill-stop for limiting the degree of drilling action into the lenses as a divisional application of our pending application No. 719,950 filed September 12, 1912.

The main object is to provide the machine with a multiple stop gage coöperating with one of the movable operating members for reciprocating the drill, whereby lenses of different thickness may be drilled a proper distance from one side by simply adjusting the stop-gage so as to bring its particular stop corresponding to the gage of the lens into registration with a coöperative stop or abutment on the reciprocating drill-supporting frame.

Another object is to enable one of the coöperative stop members to be adjusted to properly calibrate the machine for drilling lenses of predetermined gage or thickness.

A further object is to provide means for yieldingly holding the multiple stop gage in any of its adjusted positions and, at the same time, to permit it to be easily and quickly shifted for drilling lenses of different thickness.

Other objects and uses will be brought out in the following description.

In the drawings—

Figure 1 is a transverse vertical sectional view, partly in elevation, of the upper portion of a lens-drilling machine illustrating the use of our improved stop gage.

Fig. 2 is a horizontal sectional view of the upper portion of the drill-supporting frame showing the stop gage seen in Fig. 1 in top plan.

Fig. 3 is a detail vertical sectional view on line 3—3 of Fig. 2 through the same gage and its support together with the locking pin and adjacent end of the spring for holding the gage in locking engagement with its support.

Fig. 4 is a vertical sectional view of a modified form of stop-gage in which the multiple stop is mounted on the supporting carriage for the drill spindle.

Fig. 5 is a face view of the same stop gage shown in Fig. 4 and supports therefor in section.

Fig. 6 is a side elevation of a still further modified form of depth gage.

This drilling machine comprises an upright standard —1— preferably of cast metal having integral forwardly projecting arms or brackets —3— and —4— spaced some distance apart one above the other near the upper end thereof, the rear side of the upper portion of the standard being provided with vertical ways —5— upon which is mounted a vertically movable bracket —6— carrying a horizontal shaft —7— upon which is mounted a pair of idler sheaves —8— for receiving a driving belt (not shown), said bracket being clamped in its adjusted position by one or more bolts —9—, as shown more clearly in Fig. 1.

The forward ends of the arms —3— and —4— are provided with vertically alined journal bearings —10— for receiving a vertically disposed revoluble drill spindle —11— having its lower end provided with a socket —12— in which a drill —13— is secured by means of a set screw —14—, the upper end of said drill spindle being journaled in a yoke —15— which is disposed some distance above the upper arm or bracket —4— and is secured to the upper end of a vertical guide rod —16—.

This guide rod is slidable endwise in vertically alined guide openings or ways —17— and extends a short distance below the lower arm —3— and together with the yoke —15— constitutes what may be termed the supporting frame for the drill spindle for moving the latter axially.

A pulley —18— is secured by a set screw —19— to the intermediate portion of the drill spindle —11— between the arms or brackets —3— and —4— and is adapted to be driven by the belt previously mentioned which passes around the sheave —8— and is adapted to be connected to any available source of power, not necessary to herein illustrate or describe.

Any suitable work holder may be provided for holding the lens in proper position for drilling, and comprises a lens rest or post —20— loosely mounted in an aperture in a laterally projecting arm —21— of a bracket —22— which projects forwardly from one side of the standard —1— below the arm —3—.

The post —20— is coaxial with the drill spindle and its upper end is preferably tapered so as to form a lens bearing of relatively small area to permit the tilting of various forms of lenses, such as toric, cylindrical and the like, to bring the plane of the drilled portion of the lens at right angles to the axis of the drill.

The lower end of the lens rest or post —20— is provided with a head —23— having a convex lower face resting against the underlying block —24—, said block being carried in a manner not necessary to herein illustrate or describe upon a vertically swinging bracket —25— which is journaled in the standard —1— as shown more clearly in Fig. 1.

The mechanism for reciprocating the vertically movable drill-supporting frame is also shown in and forms the subject matter of our pending application No. 719,950 previously referred to and need not, therefore, be specifically described herein except in a general way; that is the mechanism comprises an operating lever —26— having one end pivoted at —27— to the upright standard —1— and its lower end provided with a handle —28—, said lever being provided with a fork arm —29— in operative engagement with a pin —30— on the guide rod —16—.

The lever —26— is yieldingly connected by a spring —31— to a bell crank lever —32— which in turn is pivoted to the fork rock arm —29— of the lever —26—, the object of this yielding connection being to enable the drill to be brought into drilling engagement with the lenses under a yielding and more uniform pressure and without liability of breaking the lens, the entire drill frame and its operating means being returned to its normal position by a compression spring —34—, surrounding the guide rod —16— between the laterally projecting arm —3— and pin —30—.

In order that lenses of varying standard thicknesses may be drilled to certain predetermined depths from one side, we provide an adjustable depth gage having different portions or points thereof of varying thicknesses corresponding to the various standard thicknesses of lenses adapted to be brought into registration with a suitable stop for limiting the movement of the drill supporting frame and thereby limiting the degree of movement of the drill into the lens in the initial operation of drilling from one side.

The preferred form of gage shown in Figs. 1, 2 and 3 consists of a hardened metal disk —35— encircling the upper portion of the guide rod —16— concentric therewith and resting loosely upon the upper face of the upper arm —4— of the standard —1—, said disk being provided with a plurality of, in this instance six, steps or abutments —36— arranged circumferentially around the axis of the disk in different horizontal planes, each step being gaged to correspond to a lens of predetermined standard thickness and is adapted to be shifted by rotation of the disk into vertical alinement with a coöperative stop —37— on the yoke —15— of the drill supporting frame, said stop being preferably made in the form of a screw engaged in a threaded aperture in said yoke and projecting some distance below the same for contact with the step which may be alined therewith as the drill supporting frame is depressed in the operation of drilling.

The gage disk is provided in its underside with a series of apertures or sockets —39— one for each step for receiving a locking pin —40— projecting upwardly from the upper face of the arm —4— to lock the disk in its adjusted position, said disk being held in locking engagement with the pin —40— by means of a coil spring —41— which encircles the upper portion of the guide rod —16— between the upper face of the disk and lower face of the yoke —15—.

In adjusting the disk, it is simply necessary to elevate the same by hand against the action of the spring —41— until disengaged from its locking pin —40—, whereupon it may be rotated to bring any one of the other steps into alinement with the stop pin —37—.

In Figs. 4 and 5, we have shown a modified form of gage disk —42— as journaled upon a circular bearing —43— on a yoke —44— and provided with an eccentric bearing face —45— for coöperative contact at any point with the upper end of a stop pin —46— which latter is, in this instance, screwed in a threaded aperture in the arm —4— and held in its adjusted position by a set screw —47—.

The side of the disk —42— opposite the cam face —45— is provided with a series of radial slots —48— of different widths circumferentially corresponding to different standard thicknesses of lenses which they are adapted to receive, said slots constituting trial gages for determining the thickness of any lens which it may be desired to drill. That is, the lens to be drilled is taken in hand and placed edgewise in the notch or slot corresponding most nearly to its thickness and then with the lens still in the slot and as a handle the disk is rotated about its axis until the lens comes in contact with a stop —49—, by which operation the portion of the cam face —45— corresponding to the depth to which such lens should be drilled is brought into vertical alinement with the upper end of the stop pin —46— so that when the drill frame is depressed to bring the drill into contact with the lens, the depth of the drill hole will be limited by the engagement of the edge of the disk —45— with the stop pin —46—.

The slots —48— progressively increase in width circumferentially in one direction from one end to the other end of the series, while the opposite cam face —45— gradually increases in radius in the same direction so that when a lens is placed in the narrowest slot and brought against the stop —49— as indicated in Fig. 5, the point in the cam face of least radius is brought into vertical alinement with the stop pin, thereby allowing the drill frame to move through a greater distance before the drill contacts with the lens than would be the case when either of the other slots are brought into the same relation to the stop —49— by the positioning of the lens therein and turning of the disk, the stop pin —46— and cam face being relatively adjusted so as to allow the drill to enter only part way through the lens in the initial operation of drilling from one side after which the lens is inverted and the drilling operation finished from the opposite side in the manner previously described.

In Fig. 6 is shown a modified depth gage in which a screw —50— may be substituted for the screw —37— and provided with an annular disk or collar —51— having a circular series of indexes or graduations coacting with the fixed index on the yoke —52— which takes the place of the yoke 15, whereby the rotary adjustment of the screw in one direction or the other will vary the distance between its lower contact end and upper face of the arm —4— with which it is adapted to coact to limit the drilling movement of the drill into the lens to correspond to the index or graduation on the disk or collar.

This disk or collar is preferably threaded internally for receiving the screw —50— and permitting it to be adjusted thereon to cause the registration of any one of the graduations corresponding to a lens of certain prescribed thickness to register with the fixed index when the screw-stop is properly adjusted to limit the drilling of such lens to the desired degree, the disk being held in operative position by a set-screw —53—.

The pitch of the threads of the screw —50— is such that a predetermined degree of rotation will determine the degree of movement of the drill into a lens of predetermined gage while the graduations on the disk —51— indicate such degree of rotary movement and also the gage of the lens to be drilled.

What we claim is:

1. In a lens drilling machine, the combination with a frame, an axially movable drill spindle, a guide rod parallel therewith and a yoke connecting the spindle and rod to cause them to move endwise in unison, of cooperative stops mounted, respectively, on the frame and yoke for limiting the movement of the rod and spindle during the drilling operation, one of said members being a ring having stepped abutments within the planes of its opposite faces, said ring being adjustable rotarily to register said abutments in sequence with the other member.

2. In a lens drilling machine, the combination with a frame, an axially movable drill spindle, a guide rod parallel therewith and a yoke connecting the spindle and rod to cause them to move endwise in unison, of cooperative stops mounted, respectively, on the frame and yoke for limiting the movement of the rod and spindle during the drilling operation, one of said members consisting of a rotarily adjustable disk having stepped abutments between its opposite end faces registrable one by one with the other member as the disk is rotated.

In witness whereof we have hereunto set our hands this 18th day of February, 1913.

GUSTAV A. BADER.
CHAUNCEY W. HOWLAND.

Witnesses:
WILLIAM J. ESPEY,
MARION GOETCHIUS.